United States Patent
Meyer et al.

(10) Patent No.: US 6,811,348 B1
(45) Date of Patent: Nov. 2, 2004

(54) DEVICE FOR LOCKING IN POSITION A MOBILE PART RELATIVE TO A FIXED PART

(75) Inventors: Guy Meyer, St Medard en Jalles (FR); Jean-Marc Darrieux, Bordeaux (FR)

(73) Assignee: Thales Avionics S.A., Velizy Villacoublay (FR)

(*) Notice: Subject to any disclaimer, the term of this patent is extended or adjusted under 35 U.S.C. 154(b) by 103 days.

(21) Appl. No.: 10/088,905

(22) PCT Filed: Sep. 19, 2000

(86) PCT No.: PCT/FR00/02595
§ 371 (c)(1),
(2), (4) Date: Mar. 25, 2002

(87) PCT Pub. No.: WO01/21022
PCT Pub. Date: Mar. 29, 2001

(30) Foreign Application Priority Data

Sep. 24, 1999 (FR) .............................. 99 11969

(51) Int. Cl.[7] .................................................. B25G 3/18
(52) U.S. Cl. ................. 403/325; 403/109.3; 403/109.7; 403/109.8; 403/321; 403/322.1; 403/324; 403/328; 403/381; 403/DIG. 4; 248/223.41; 248/224.51; 248/224.61; 24/607; 24/613
(58) Field of Search .............. 403/33, 83, 109.1–109.3, 403/109.7, 109.8, 321, 322.1, 322.3, 322.4, 324, 325, 326, 328, DIG. 4, 381; 248/223.41, 224.51, 224.61, 222.11, 222.12, 222.13; 348/8; 24/607, 612, 613

(56) References Cited

U.S. PATENT DOCUMENTS

| | | | |
|---|---|---|---|
| 3,608,935 A | * | 9/1971 | Hodapp, Jr. ............. 403/322.1 |
| 3,796,901 A | | 3/1974 | Mayer et al. |
| 5,226,181 A | | 7/1993 | Acker et al. |
| 5,254,852 A | | 10/1993 | Filipovich et al. |
| 5,332,183 A | * | 7/1994 | Kagayama ............. 248/222.13 |
| 5,479,294 A | | 12/1995 | Darrieux et al. |
| 5,517,337 A | | 5/1996 | Dupin et al. |
| 5,581,806 A | | 12/1996 | Capdepuy et al. |
| 5,742,937 A | | 4/1998 | Baudou et al. |
| 6,078,428 A | | 6/2000 | Rambert et al. |
| 6,157,471 A | | 12/2000 | Bignolles et al. |
| 6,158,866 A | | 12/2000 | Gulli et al. |
| 6,262,849 B1 | | 7/2001 | Potin et al. |
| 6,338,586 B1 | * | 1/2002 | Kuo ........................ 403/109.7 |
| 6,356,393 B1 | | 3/2002 | Potin et al. |

* cited by examiner

Primary Examiner—Daniel P. Stodola
Assistant Examiner—Victor MacArthur
(74) Attorney, Agent, or Firm—Oblon, Spivak, McClelland, Maier & Neustadt, P.C.

(57) ABSTRACT

A device for locking a position of a moving part with respect to a fixed part. The moving part is positioned with respect to the fixed part isostatically. The device generates a force opposing the loss of contact of all the points of isostatic contact between the moving part and the fixed part so as to lock the position.

20 Claims, 6 Drawing Sheets

DEVICE FOR LOCKING IN POSITION A MOBILE PART RELATIVE TO A FIXED PART

BACKGROUND OF THE INVENTION

1. Field of the Invention

The invention relates to a device for locking a position of a moving part with respect to a fixed part.

2. Description of the Related Art

When there is the desire to lock, precisely, the position of a moving part with respect to a fixed part, it is necessary to have control both over the relative position of one part with respect to the other and over the locking of this position.

Isostatic positioning constitutes precise and repeatable positioning. The locking of such positioning often entails several maneuvers, and this makes the device more complicated and lengthens the time taken to operate it.

By way of example, mention may be made of a moving part positioned with respect to a fixed part on a plane in eliminating three degrees of freedom of the moving part with respect to the fixed part, in a straight line parallel to the plane eliminating two other degrees of freedom, and at a point distinct from the straight line and from the plane and eliminating the last degree of freedom. To lock this position, use is made of a clamp, the force of which opposes the loss of contact of the moving part with respect to the positioning plane. Before tightening the clamp, it is necessary to apply to the moving part one or more other additional forces separate from the force applied by the clamp, to press the moving part against the straight line and the positioning point. Once the clamp has been tightened, it is possible to release the additional force or forces. The moving part is then held with respect to the fixed part against the straight line and the positioning point by adhesion. In the above-mentioned example, if the additional force or forces are not sufficient, there is the risk that it will not be possible to obtain correct bearing against the straight line or the point, and that correct positioning will thus be compromised. In addition, it is necessary to carry out at least two maneuvers in order to lock the position. A first maneuver consists in applying the additional force or forces and a second maneuver consists in tightening the clamp. The need for these numerous maneuvers increases the time taken for positioning and for locking.

It is an object of the invention to alleviate these drawbacks by providing a device which is simple and quick to operate.

BRIEF SUMMARY OF THE INVENTION

To achieve this object, the subject of the invention is a device for locking a position of a moving part with respect to a fixed part, the moving part being positioned with respect to the fixed part isostatically, characterized in that the device comprises means generating a force opposing the loss of contact of all the points of isostatic contact between the moving part and the fixed part so as to lock the position.

One advantage associated with the isostatic positioning is that good repeatability can be attained in successive positionings of the moving part with respect to the fixed part, even if the two parts, or at least their areas of contact, are not produced precisely. The absence of the need for precision also makes it possible to reduce the cost of producing the two parts.

The invention finds a particular use in the mounting of an optomechanical component on a helmet. This component comprises, for example, a pair of night vision goggles.

In this example, it is necessary for the pupil of each half of the goggles to be positioned precisely in front of the eye of the person wearing the helmet. The invention allows sufficient precision during successive removals and remountings of the optomechanical component. The invention also allows the person wearing the helmet to mount the optomechanical component blind with just one hand, that is to say without being able to see the positioning means and the locking means.

BRIEF DESCRIPTION OF THE DRAWINGS

The invention will be better understood and other advantages will become apparent from reading the detailed description of one embodiment of the invention illustrated by the appended drawing in which:

FIGS. 7, 8 and 9 depict, in section, the moving part in position with respect to the fixed part;

DETAILED DESCRIPTION OF THE INVENTION

For greater convenience, the same topological references will depict the same elements in the various figures.

Figure 1:
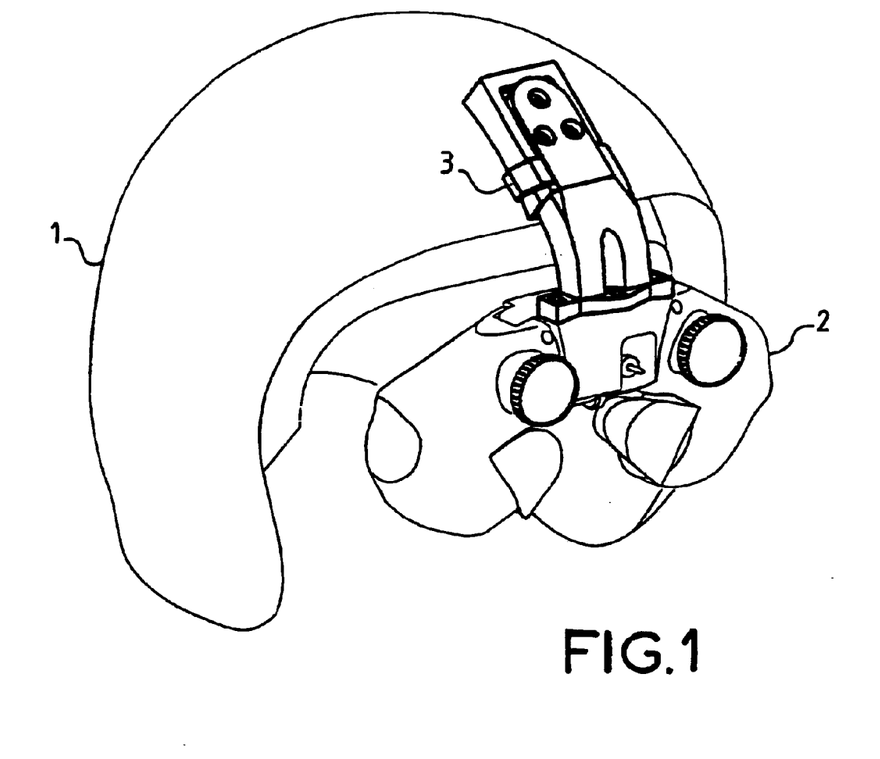
FIG. 1 depicts an optomechanical component whose position with respect to a helmet is locked.
Figure 2:
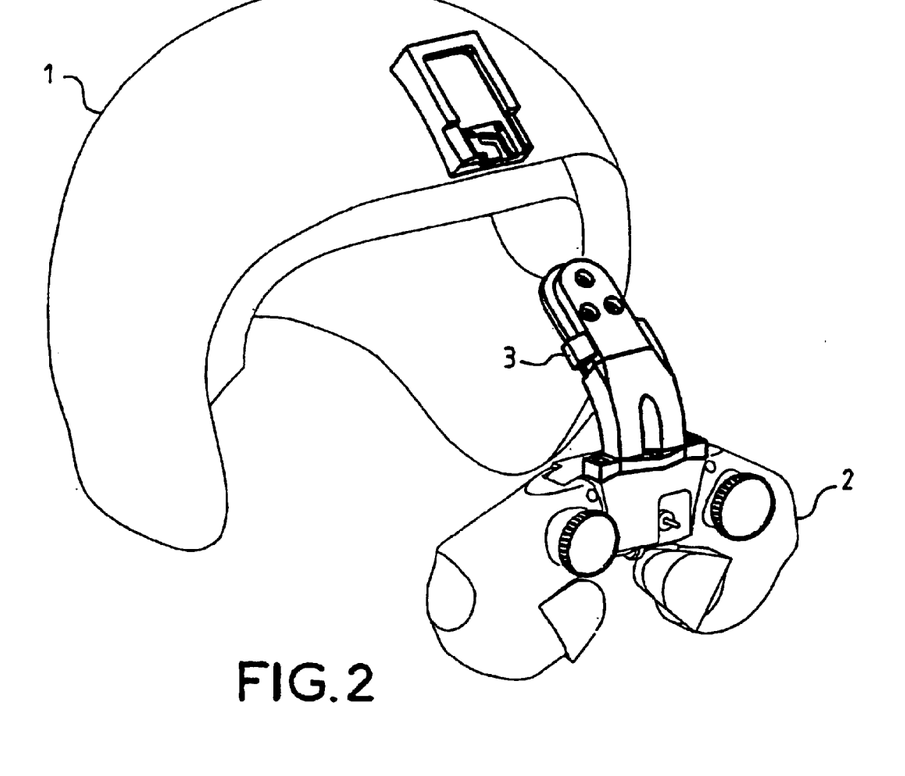
FIG. 2 depicts the optomechanical component and the helmet, both depicted in FIG. 1, some distance apart.

FIGS. 1 and 2 depict a helmet 1 protecting the head of an individual and night vision goggles 2. In FIG. 1, the night vision goggles 2 are positioned and locked on the helmet 1. While in FIG. 2, the goggles 2 and the helmet 1 are depicted some distance apart. Obviously, the example of the mounting of goggles 2 on a helmet 1 is given merely by way of example and the invention can be used each time there is a desire to mount a moving part, in this instance the goggles 2, on a fixed part, in this instance the helmet 1, and remove it therefrom several times, making sure that the moving part 2 is locked in a precise and repeatable position with respect to the fixed part 1.

In the particular embodiment described later on in conjunction with the goggles 2 and the helmet 1, locking and unlocking of the precise position can be achieved very simply with one hand, pressing on a button 3 situated on the moving part 2. This maneuver can be formed without the need to look at the button 3 and this presents an advantage in terms of ergonomics.

Figure 3:
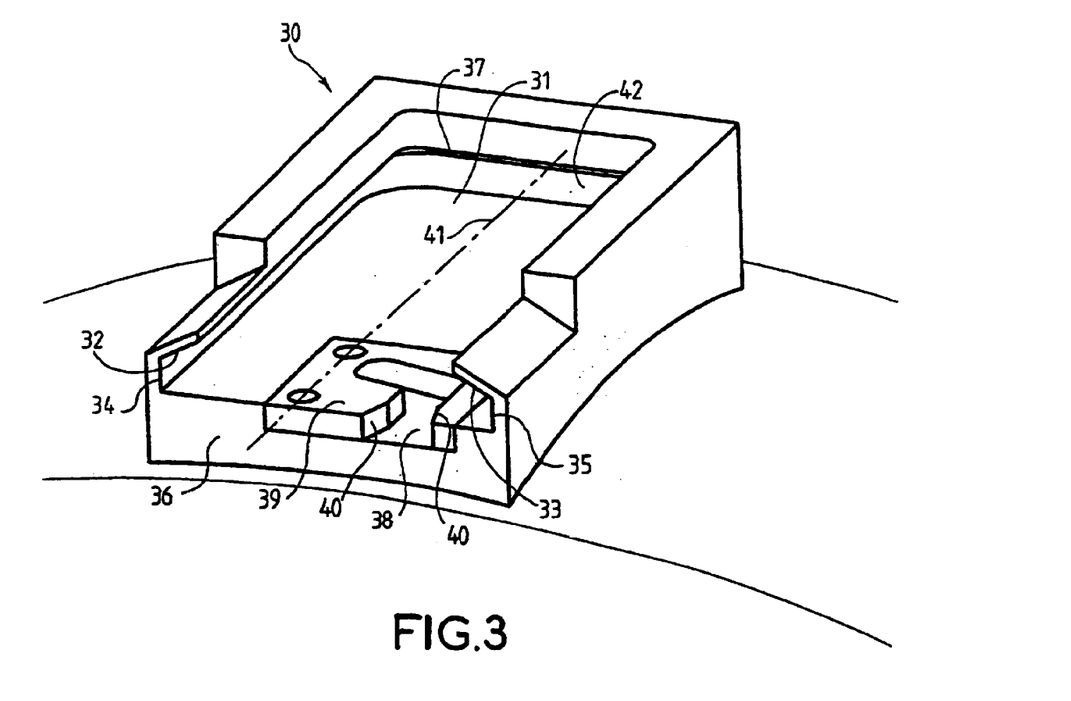
FIG. 3 depicts a fixed part.

The fixed part 1 depicted in FIG. 3 comprises means for providing isostatic positioning of the moving part 2, not depicted in this figure. These means comprise, for example, a female dovetail 30. The female dovetail 30 comprises a base 31 which is roughly planar and two inclined faces 32 and 33. The slope of each of the two inclined faces forms an acute angle with the base 31. The slopes of each inclined face 32 and 33 are advantageously equal. The intersections between the inclined faces 32 and 33 and the base form two parallel straight lines. Advantageously, to make the female dovetail 30 easier to produce, the intersections may be partially filled by a fillet or a meeting plane joining the inclined face 32 and 33 and the base 31 of the female dovetail 30.

In FIG. 3, a plane 34 connects the inclined face 32 to the base 31 and a plane 35 connecting the inclined face 33 to the base 31. The planes 34 and 35 are, for example, roughly parallel and perpendicular to the base 31. The female dovetail 30 opens to the outside for example along a plane 36 perpendicular to the base 41 and to the planes 34 to 35.

The female dovetail 30 allows a translational movement of a complimentary male dovetail belonging to the moving part 2 along an axis 41 roughly perpendicular to the plane 36. The male dovetail will be described later.

The female dovetail 30 also provides a means for stopping the translation of the male dovetail sliding in the female dovetail 30. This means comprises, for example, an inclined face 37, the gradient of whose slope, with respect to the base 31, is roughly similar to the gradient of the slope of the inclined faces 32 and 33. The inclined face 37 is roughly planar. Its intersection with the base 31 is roughly perpendicular to the intersections between the inclined faces 32 and 33 and the base 31.

Advantageously, a plane 42, roughly perpendicular to the base 31, partially fills the intersection between the inclined face 37 and the base 31.

Advantageously, fillets are provided between the inclined face 37 and each of the inclined faces 32 and 33. In FIG. 3, the perspective depiction means that only the fillet between the inclined face 32 and the inclined face 42 is visible.

Fillets are likewise provided between the plane 42 and each of the planes 34 and 35.

Hollowed into the base 31, the fixed part has a groove 38 formed of a bottom roughly parallel to the base 31 and of sides which are roughly planar and perpendicular to the base 31.

From the plane 36, where the groove 38 opens to the outside, the groove 38 extends first of all roughly parallel to the planes 34 and 35 and then inclines by an angle smaller than 900, for example in the direction of the plane 34.

A finger 50 belonging to the moving part can slide in the groove 38, bearing against its sides. The finger 50 will be described later on. Advantageously, to avoid premature wear of the base 31 when the finger 50 of the moving part 2 rubs against the sides of the groove 38, the groove 38 may be made in an attached part 39 made of a material that is harder than the remainder of the fixed part 1. This makes it possible to produce the remainder of the female dovetail 30 from a softer material such as, for example, a plastic, and thus to reduce the mass of the fixed part 1. The attached part 39 is made, for example, of steel.

Figure 4:
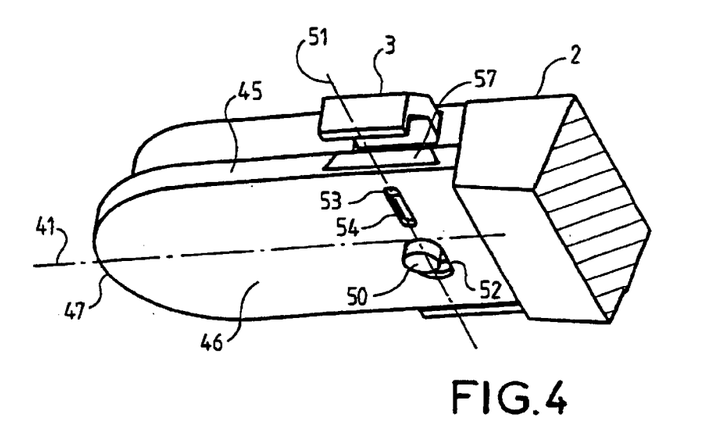
FIG. 4 depicts a moving part.

FIG. 4 shows the moving part 2 which comprises the male dovetail 45 that compliments the female dovetail 30. The male dovetail 45 comprises a base 46 and two inclined faces 48 and 49 clearly visible in FIG. 5. The male dovetail 45 comprises an end 47 intended to come into contact with the inclined face 37, which end is advantageously not planar but roughly of revolution about an axis perpendicular to the base 46 and lying roughly midway between the two inclined faces 48 and 49. Thus, contact between the inclined base 37 and the end 47 will be more or less point contact.

Figure 5:
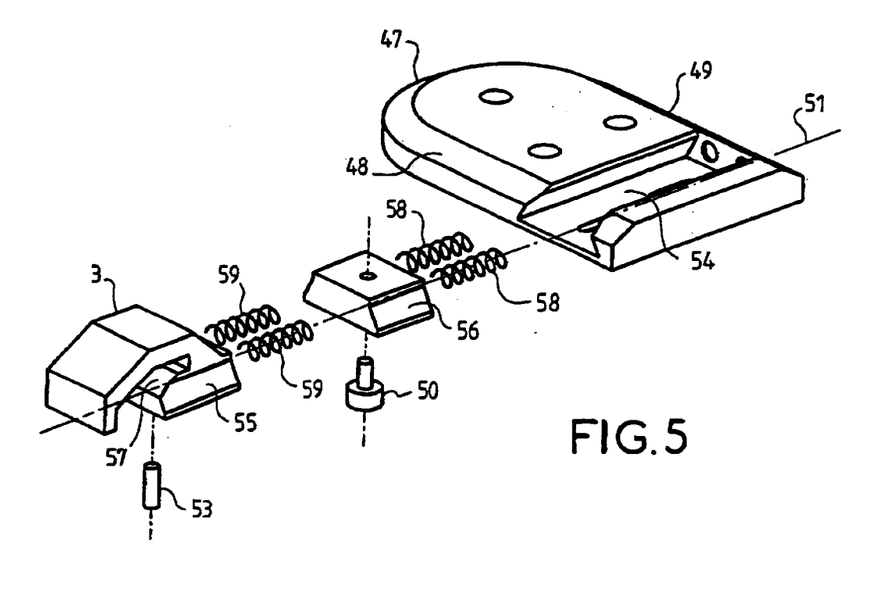
FIG. 5 depicts an exploded view of the moving part.

The intersections between the inclined faces 47, 48 and 49 and the base 46 are truncated by surfaces which, for example, are roughly planar so that these surfaces cannot come into contact with the planes 34, 35, and 42 of the female dovetail 30.

The finger 50, clearly visible in FIG. 4, protrudes from the base 46. It is roughly cylindrical. Its diameter is slightly smaller than the width of the groove 38 so that it can move therein. Its height, measured with respect to the base 46, is slightly less than the depth of the groove 38, the depth being measured at right angles to the base 31, so that only the cylindrical part of the finger 50 is in contact with the sides of the groove 38. The finger 50 can move in translation with respect to the remainder of the moving part 2 roughly along an axis 51 contained in a plane parallel to the base 46 and perpendicular to the axis 41. The translational movement of the finger 50 with respect to the moving part 2 is limited in both directions of translation, for example by means of an oblong hole 52 made in the base 46, and through which the finger 50 passes.

In FIG. 4, it is also possible to make out the button 3 which allows the finger 50 to be moved in translation along the axis 51. The button 3 may be secured to the finger 50 but may advantageously move in translation with respect to the remainder of the moving part 2 along the axis 51 independently of the finger 50. As, with the finger 50, the translational movement of the button 3 is limited for example by means of a stud 53 secured to the button 3, the stud 53 being able to move in an oblong hole 54 made in the base 46. Unlike the finger 50, the stud 53 does not protrude from the base 46 so as not to impede the translational movement along the axis 41 of the male dovetail 45 with respect to the female dovetail 30.

When the button 3 is not secured to the finger 50 it comprises a facet 57, for example one roughly parallel to the inclined face 48 and intended to bear against the inclined face 32 of the female dovetail 30.

Means of guiding the translational movement of the button 3 and of the finger 50 along the axis 51 are provided in the moving part 2. The guide means comprise, for example, a second pair of dovetails. This second pair comprises a small female dovetail 54 made in the body of the moving part 2 and two small male dovetails 55 and 56, one of them, 55, made in the button 3 and the other of them, 56, secured to the finger 56. Advantageously, the axis 51 of travel of the second pair is perpendicular to the axis 41 of travel of the first pair of dovetails.

An elastic element 58 is provided to tend to bring the finger 50 closer to one of the ends of the oblong hole 52. When pressure is exerted on the button 3, the elastic element 58 is compressed. This elastic element comprises, for example, two helical springs.

When the button 3 is not secured to the finger 50, the moving part comprises a second elastic element 59 tending to separate the button 3 from the finger 50. The second elastic element 59 may also comprise two helical springs. The function of the two elastic elements 58 and 59 will be described in greater detail by means of FIGS. 7 to 9.

Figure 6:
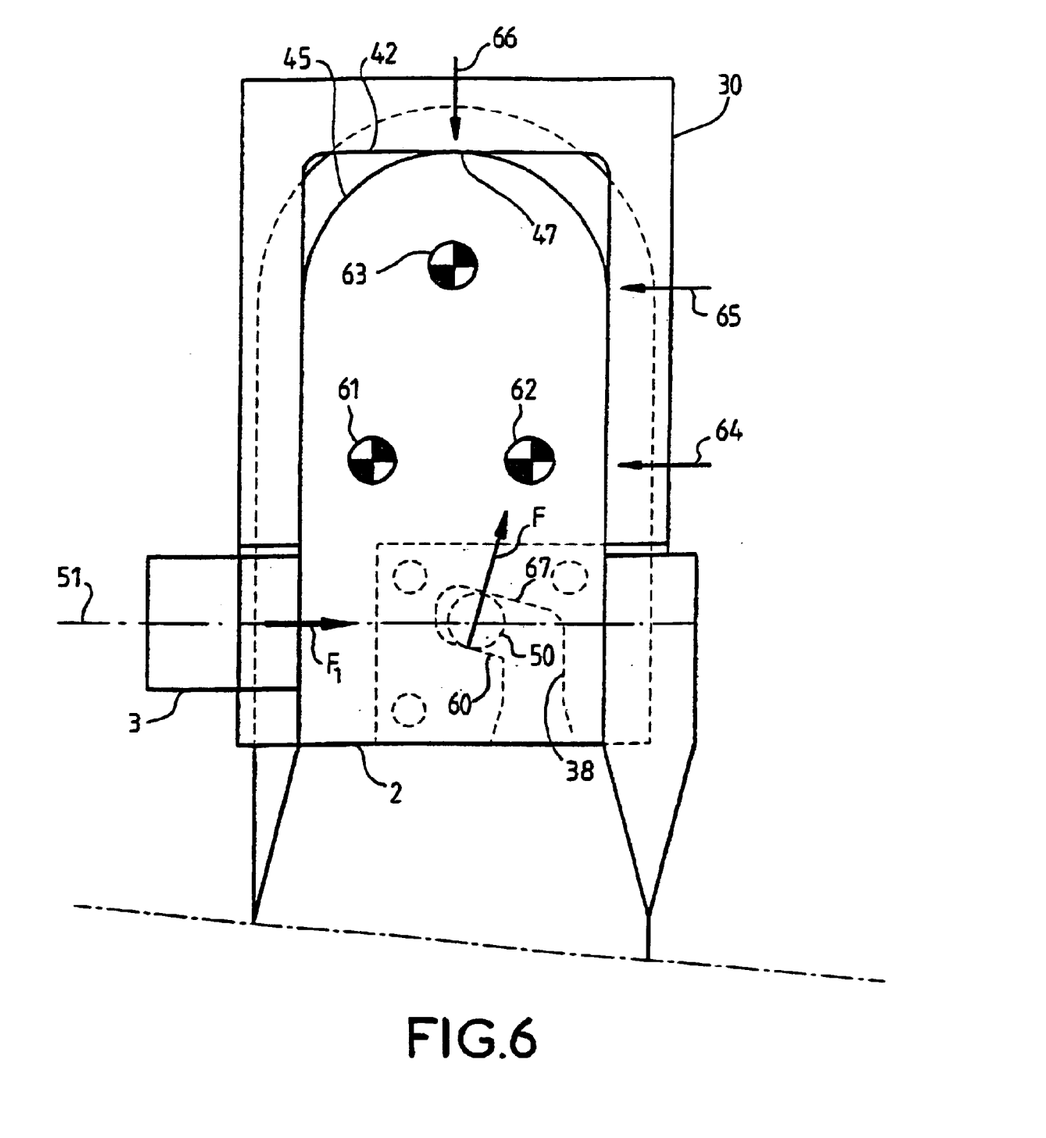
FIG. 6 depicts a view from above of the moving part in the position in which it is locked with respect to the fixed part.

FIG. 6 depicts the male dovetail 45 engaged in the female dovetail 30. The end 47 of the male dovetail 45 is in contact with the inclined face 47 of the female dovetail 30. The finger 50 is, for its part, in contact with one of the sides 60 of the groove 38. The side 60 is advantageously a roughly planar surface perpendicular to the base 46 and forming an acute angle with the axis 51. The value of the acute angle is, for example, of the order of 150. The finger 50 has a convex shape, for example circular, so as to make roughly point contact between the finger 50 and the side 60 which is roughly planar. Advantageously, the finger 50 comprises a means for limiting its friction with the side 60. This means comprises, for example, a ball bearing, the outer cage of which is in contact with the side 60. The inner cage of this bearing will be fixed to the small male dovetail 56. Thus, when the elastic element 58 pushes the finger 50 back against the side 60, the female part 1 generates a force F on a the male part 2, the force being directed roughly at right angles to the side 60.

The force F has the effect of pressing the male dovetail 45 into the female dovetail 30.

More specifically, when the force F presses the male dovetail 45 against the inclined faces 33 and 37 of the female dovetail 30, it also tends to press the base 46 of the male dovetail 45 against the base 31 of the female dovetail 30. The two bases 31 and 46 in contact form a planar contact defining three points 61, 62 and 63 of isostatic positioning. Furthermore, the contact between the male dovetail 45 and the inclined face 33 needs to be long enough to embody a line of contact which defines two additional isostatic points 64 and 65. Finally, the last point of isostatic positioning 66 is defined, at the roughly point contact, between the end 47 of the male dovetail 45 and the inclined face 37. This last isostatic point 66 halts the translational movement of the two dovetails one with respect to the other. Of course, the dovetails 30 and 45 are given merely by way of example and any other means of positioning, between the moving part 2 and the fixed part 1, culminating in isostatic positioning, will make it possible for the moving part 2 to be repositioned precisely with respect to the fixed part 1.

The elastic element 58 tends to press the finger 50 against the side 60 so that the force F maintains the contact of the six isostatic points 60 to 66.

The orientation of the side 60 is such that the direction of the force F is parallel to the bases 31 and 46 of the two dovetails 30 and 45. In addition, the position and orientation of the side 60 is such that the direction of the force F passes between the fourth and fifth isostatic points 64 and 65 on the one hand, and the sixth isostatic point 67 on the other hand, so as to avoid any loss of contact of one of these points.

Advantageously, the orientation of the side 60 and the coefficient of friction of the finger 50 with respect to the side 60 are defined so that only a force tending to compress the elastic element 58 can cause the moving part 2 to move with respect to the fixed part 1, thus avoiding the possibility of any force, particularly a force the direction of which is denoted 41, being able to cause the moving part 2 to move with respect to the fixed part 1. It is possible to degrade this characteristic slightly by defining the orientation of the side 60 and the coefficient of friction in such a way that, in order to uncouple the dovetails 30 and 45 without acting on the button 3, it would be necessary to produce a very significant force.

When the button 3 is not secured to the finger 50, the facet 57 exerts a force -F1 on the inclined face 32 of the female dovetail 30. The force -F1 is generated by the elastic elements 58 and 59. It is carried along the axis 51. FIG. 6 depicts the reaction F1, opposing the force -F1, of the inclined face 32 on the moving part 2. The reaction F1, combined with the force F, improves the contact of the moving part 2 on the two points of isostatic contact 64 and 65.

The directions of each of the two forces F and F1 are parallel to the bases 31 and 46 of the two dovetails 30 and 45.

The facet 57 and the elastic element 59 form additional means opposing the loss of contact of the two isostatic points 64 and 65.

Figure 7:
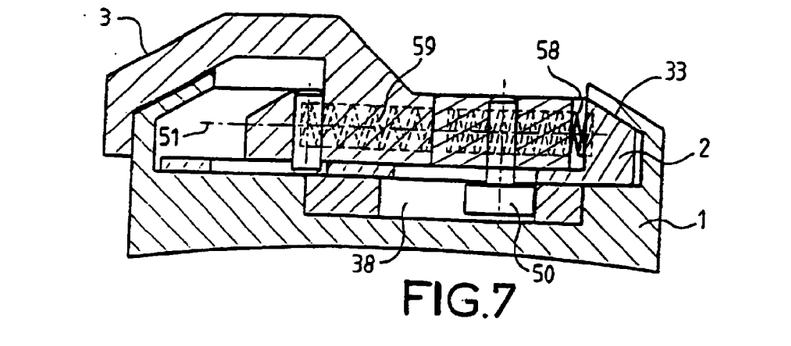
FIG. 7 depicts an unlocked position.
Figure 8:
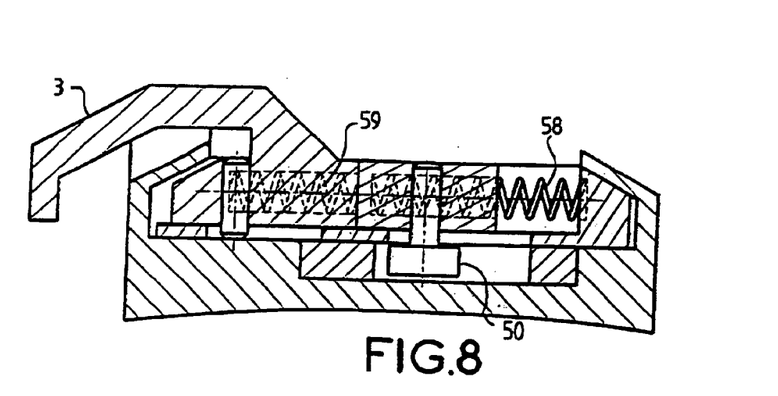
FIG. 8 depicts a position that is intermediate between the unlocked position and the locked position.
Figure 9:
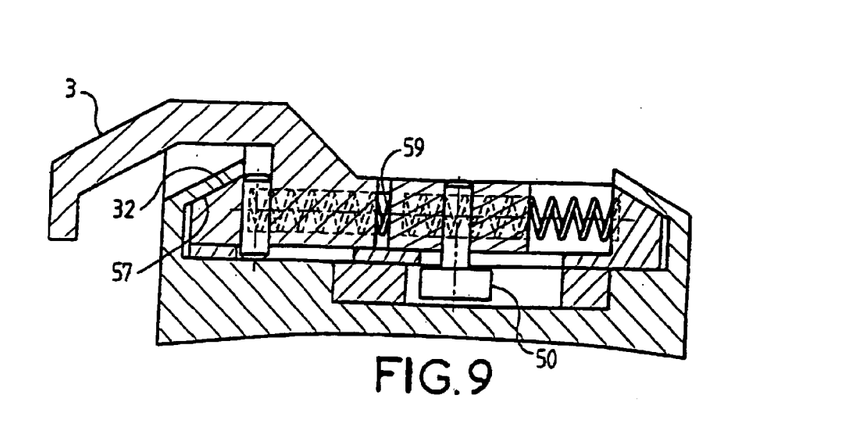
FIG. 9 depicts a locked position.

FIGS. 7, 8 and 9 allow a better understanding of the locking and unlocking of the moving part 2 with respect to the fixed part 1. These figures depict a device according to the invention in which the button 3 is not secured to the finger 50. The three FIGS. 7 to 9 are depicted in section on a plane parallel to the plane 36 and containing the axis 51. In the three figures, the moving part 2 is set in position with respect to the fixed part 1.

In FIG. 7, a user, not depicted, is pressing on the button 3 in the direction of the inclined face 33. The two elastic elements 58 and 59 are compressed and the finger 50 is bearing against one of the sides of the groove 38 in such a way as to allow the male dovetail 45 to leave the female dovetail 30.

In the position depicted in FIG. 8, the button 3 has been partially released. The stiffness of the elastic element 58 is chosen to be higher than that of the elastic element 59 so that in this position, the finger 50 comes to bear against the side 60 of the groove 38 while the button 3 remains bearing against the finger 50. In FIG. 8, the side 60 is not visible because it is in front of the plane of section. In this position, locking of the isostatic position has already been achieved when the finger 50 bears against the side 60. However, this locking is advantageously supplemented by completely releasing the button 3, until the position depicted in FIG. 9 is reached.

In this position, the finger 50 is still bearing against the side 60 and, in addition, as the elastic element 59 relaxes, the facet 57 of the button 3 comes to bear against the inclined face 32 of the female dovetail 30.

Advantageously, the groove 38 has a side 67, visible in FIG. 6. The side 67 is parallel to the side 60. The two sides 60 and 67 are spaced apart by a distance that slightly exceeds the diameter of the finger 50 so that the finger 50 is never in contact with both sides 60 and 67 at the same time. In the locked position, depicted in FIG. 9, the finger 50 is bearing against the side 60 and when pressure is applied to the button 3, the finger 50 comes into contact with the side 67 so that the side 67 exerts a force opposing the force F on the finger 50 which helps with disengaging the male dovetail 45 from the female dovetail 30.

Advantageously too, the fixed part comprises means for compressing the elastic element 58 when the moving part 2 nears its isostatic position with respect to the fixed part 1 without any external action other than that necessary for the bringing together being required to compress the elastic element 58. These means comprise, for example, at least one entry chamfer 40 allowing the finger 50 to move to enter the groove 36 during the bringing-together. In FIG. 3, two chamfers 40 widening the entry to the groove 38 have been depicted. These means make it possible to avoid pressing on the button 3 during the bringing-together.

When the button 3 is not secured to the finger 50, means are also provided so that when the moving part 2 nears the isostatic position, the elastic element 59 is compressed even when no action is exerted on the button 3. These means comprise, for example, a chamfer produced on the inclined face 32 or on the facet 57.

What is claimed is:

1. A device for locking a position of a moving part with respect to a fixed part, the moving part being positioned with respect to the fixed part isostatically, the device comprising:
    a female dovetail belonging to the fixed part;
    a male-dovetail belonging to the moving part, wherein bases of the female and male dovetails are in contact and define three first isostatic points, and wherein two inclined faces in contact, each belonging to one of the female and male dovetails, respectively, define fourth and fifth isostatic points; and
    means for generating a force opposing a loss of contact of a plurality of points of isostatic contact between the moving part and the fixed part so as to lock the position.

2. The device as claimed in claim 1, wherein a sixth isostatic point stops translation of the female and male dovetails, with respect to each other, and the sixth isostatic point is formed between a face belonging to the fixed part, which face is inclined with respect to the base of the female dovetail and distinct from the inclined faces of the female dovetail, and a point on the moving part coming into abutment with this face.

3. The device as claimed in claim 1, wherein a direction of force is parallel to the bases of the female and male dovetails.

4. The device as claimed in claim 3, wherein the moving part has a finger configured to move in translation with respect to the moving part and configured to bear against a surface of the fixed part, and wherein a position and orientation of the surface of the fixed part are defined so that the force is directed between the fourth and fifth isostatic points on a side of the direction of the force and the sixth isostatic point on an opposite side thereof.

5. The device as claimed in claim 4, wherein near a contact between the finger and the surface of the fixed part, the finger is substantially convex and the surface of the fixed part is substantially planar.

6. The device as claimed in claim 5, wherein an orientation of the surface of the fixed part and a coefficient of friction of the finger with respect to the surface are defined such that only a force tending to compress the elastic element can move the moving part with respect to the fixed part.

7. The device as claimed in claim 4, further comprising an elastic element tending to press the finger against the surface of the fixed part in such a way that the force maintains contact of the first to sixth isostatic points.

8. The device as claimed in claim 4, wherein the fixed part comprises means for compressing the elastic element when the moving part nears its isostatic position with respect to the fixed part without any external action other than action necessary for the bringing-together being needed to compress the elastic element.

9. The device as claimed in claim 4, wherein translational movement of the finger with respect to the moving part is limited in both directions of the translational movement.

10. The device as claimed in claim 1, further comprising additional means opposing loss of contact of the fourth and fifth isostatic points.

11. The device as claimed in claim 10, wherein the additional means comprises a facet belonging to the moving part and pressing against an inclined face of the female dovetail opposite to the inclined face of the female dovetail that defines the fourth and fifth isostatic points.

12. The device as claimed in claim 11, wherein the facet belongs to an element configured to move in translation with respect to the moving part along an axis of translation of the finger roughly perpendicular to an axis of travel of the female and male dovetails with respect to each other, and wherein the moving element is connected to the moving part by a second elastic element.

13. The device as claimed in claim 12, wherein the axis of translation of the finger is coincident with an axis of translation of the moving element, and wherein the second elastic element tends to separate the moving element from the finger.

14. The device as claimed in claim 13, wherein the moving part is unlocked with respect to the fixed part by exerting a force on the moving element in a direction substantially perpendicular to a line containing the fourth and fifth isostatic points.

15. The device as claimed in claim 13, wherein a stiffness of the elastic element is greater than a stiffness of the second elastic element.

16. A device for locking a position of a moving part with respect to a fixed part, the moving part being positioned with respect to the fixed part isostatically, the device comprising:
    means for generating a force opposing a loss of contact of a plurality of points of isostatic contact between the moving part and the fixed part so as to lock the position;
    a female dovetail belonging to the fixed part and a male dovetail belonging to the moving part, wherein bases of the female and male dovetails are in contact and define three first isostatic points, and wherein two inclined faces in contact, each belonging to one of the female and male dovetails, respectively, define fourth and fifth isostatic points, and a sixth isostatic point stops translation of the female and male dovetails, with respect to each other, and the sixth isostatic point is formed between a face belonging to the fixed part, which face is inclined with respect to the base of the female dovetail and distinct from the inclined faces of the female dovetail, and a point on the moving part coming into abutment with this face; and means opposing loss of contact of the fourth and fifth isostatic points comprising a facet belonging to the moving part and pressing against an inclined face of the female dovetail opposite to the inclined face of the female dovetail that defines the fourth and fifth isostatic points, wherein the facet belongs to an element configured to move in translation with respect to the moving part along an axis of translation of the finger roughly perpendicular to an axis of travel of the female and male dovetails with respect to each other, the moving element is connected to the moving part by a second elastic element, the axis of translation of the finger is coincident with an axis of translation of the moving element, the second elastic element tends to separate the moving element from the finger, and the translational movement of the finger of the moving element is guided by a second female dovetail belonging to the moving part in which there slides a second male dovetail secured to the finger and a third male dovetail belonging to the moving element.

17. A device for precisely and repeatedly locking two parts, the device comprising:

a fixed part having a substantially planar base and a female dovetail;

a moving part having a substantially planar base and a male dovetail, such that, when a portion of said moving part is inserted inside a portion of said fixed part, said male dovetail fits substantially inside said female dovetail and a surface of said substantially planar base of said fixed part contacts a surface of said substantially planar base of said moving part; and force generating means for generating a force opposing a loss of contact of a plurality of contact points between said portion of said moving part and said portion of said fixed part so as to lock the parts together.

18. The device of claim 17, wherein a direction of said force is parallel to the bases of the female and male dovetails and off-axis to a direction of translation of said moving part with respect to said fixed part.

19. The device of claim 17, wherein the moving part has a finger configured to translate with respect to the moving part in a direction substantially perpendicular to a direction of translation of said moving part with respect to said fixed part, wherein, near a contact between the finger and a surface of the fixed part, the finger is substantially convex and the surface of the fixed part is substantially planar.

20. The device of claim 19, wherein an orientation of the surface of the fixed part and a coefficient of friction of the finger with respect to the surface are defined such that only a force tending to compress the elastic element can move the moving part with respect to the fixed part.

* * * * *